US011212587B1

(12) United States Patent
Sariel et al.

(10) Patent No.: US 11,212,587 B1
(45) Date of Patent: Dec. 28, 2021

(54) SUBTITLE-BASED REWIND FOR VIDEO DISPLAY

(71) Applicant: RED HAT, INC., Raleigh, NC (US)

(72) Inventors: David Sariel, Holon (IL); Arie Bergman, Gan Yavne (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/090,017

(22) Filed: Nov. 5, 2020

(51) Int. Cl.
H04N 21/472 (2011.01)
H04N 21/488 (2011.01)
H04N 21/443 (2011.01)
H04N 21/6587 (2011.01)
H04N 21/845 (2011.01)

(52) U.S. Cl.
CPC ... *H04N 21/47217* (2013.01); *H04N 21/4431* (2013.01); *H04N 21/4884* (2013.01); *H04N 21/6587* (2013.01); *H04N 21/8456* (2013.01)

(58) Field of Classification Search
CPC ......... H04N 21/47217; H04N 21/4431; H04N 21/4884; H04N 21/6587; H04N 21/8456
See application file for complete search history.

(56) References Cited

U.S. PATENT DOCUMENTS

| 9,571,870 | B1 | 2/2017 | Wilson et al. | |
|---|---|---|---|---|
| 9,852,773 | B1* | 12/2017 | Salvador | G11B 27/22 |
| 10,575,058 | B2 | 2/2020 | Patil | |
| 2008/0279535 | A1* | 11/2008 | Haque | H04N 21/2355 386/244 |
| 2017/0272820 | A1* | 9/2017 | Patil | H04N 21/4884 |
| 2018/0160069 | A1* | 6/2018 | Burger | H04N 21/4312 |

FOREIGN PATENT DOCUMENTS

| CN | 105828101 B | 3/2019 |
|---|---|---|
| WO | 2019125704 A1 | 6/2019 |
| WO | 2019244006 A1 | 12/2019 |

OTHER PUBLICATIONS

Dachowski, R., "Create Video Subtitles with Translation Using Machine Learning," Amazon Web Services, Inc., 2018, https://aws.amazon.com/blogs/machine-learning/create-video-subtitles-with-translation-using-machine-learning/.
Kovacs, G., "Smart Subtitles for Language Learning," ACM, Inc., 2013, https://dl.acm.org/doi/abs/10.1145/2468356.2479499.
Sagar, R., "Netflix is Using AI for its Subtitles," 2020, https://analyticsindiamag.com/netflix-ai-subtitles-transalation/.

* cited by examiner

*Primary Examiner* — Mishawn N. Hunter
(74) *Attorney, Agent, or Firm* — Kilpatrick Townsend & Stockton LLP

(57) ABSTRACT

A processing device can partition a video presentation into segments, wherein the beginning of each of the segments corresponds to when a specific subtitle would be displayed. In some examples, a system can be configured so that a subtitle in a selected language can be displayed at that point, even if subtitles in a different language are being displayed by default. A user can thus activate a rewind control for a video playback device or application and obtain a translation of the dialog at that point into the user's preferred language. The subtitle-based rewind feature can be implemented, as examples, in a client playback application on a playback device for streaming video, as part of a video streaming provider's back-end services deployed in a cloud network, or by a combination of the two.

18 Claims, 4 Drawing Sheets

SUBTITLE-BASED REWIND FOR VIDEO DISPLAY

TECHNICAL FIELD

The present disclosure relates generally to video control. More specifically, but not by way of limitation, this disclosure relates to providing a video rewind function that makes use of information in subtitle files.

BACKGROUND

Internet video streaming involves a client device connecting to a network including servers optimized for storing and streaming large media files, such as those used to encode and present movies and television shows. The client device includes functions to interrupt the playing of a media stream, return to an earlier time stamp in the media stream, and resume playing the media stream. Such capability allows the user watching a streaming video to experience a rewind function, similar to what has been in place with physical media, such as videotape-based systems.

A rewind function in video streaming application can be invoked to move back in the streaming video display some fixed amount of time with each jump, typically ten or fifteen seconds. Some platforms and applications also provide a way to jump back based on an observable thumbnail still image of the video content at points determined by dragging a finger across a trackpad, or by chapter breaks. If subtitles are in use, the subtitles typically also jump back so that onscreen text matches the dialog in the scene being played.

DETAILED DESCRIPTION

Figure 1:
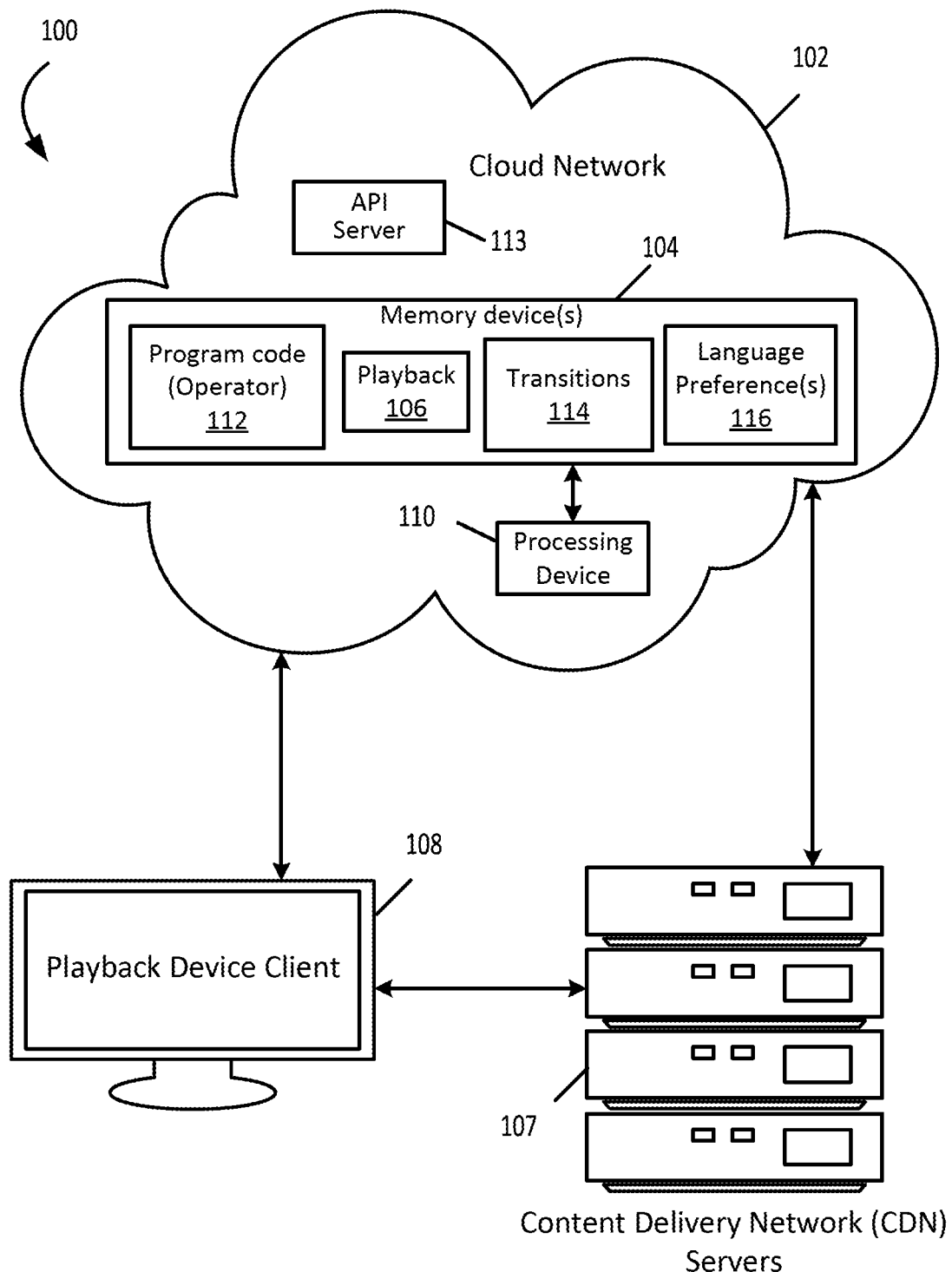
FIG. 1 is a block diagram of an example of a system that provides subtitle-based rewind capability according to some aspects of the disclosure.

Playing a digital video presentation, such as from an Internet-based streaming service, a video server, or from optical media, involves displaying both video and audio. With most systems, a user can optionally also display text subtitles to accompany the presentation. Some video content is configured to automatically cause the display of subtitles when the presentation was produced in a language other than that of the country or region where the video content is being distributed.

When playing a video presentation, if a user has trouble understanding some dialog, either the audio or the subtitle text, the user can rewind the presentation back to some arbitrary point in time as determined by the equipment or the specifications of the media involved. Typically, the time to this point is a fixed amount of time, or the time to a previous scene change, often farther than necessary. There is no file or stored information available to a video presentation application that provides any other breakpoint for use in rewinding the presentation.

If the user's difficulty in understanding is due to a difference between the user's native language and the chosen audio or subtitle language of the presentation, the user can stop the video and look at another source. Alternatively, the user can engage a subtitle display, or change the preferred language for the subtitle text if subtitles are already in use. These actions can be cumbersome and time consuming, and can be disruptive of the experience of taking in a movie or television show, especially when members of a household have different native languages, or when one is using subtitles in order to learn a new language.

Some examples of the present disclosure overcome one or more of the issues mentioned above by providing a subtitle-based rewind capability, whereby a video presentation can be rewound (e.g., or skipped back) in increments based on subtitle transitions. The video presentation can be partitioned into segments. Each segment can begin when a specific subtitle is or would be displayed, and ends at or about when the next subtitle would be displayed. The segmentation information is provided from a transition file produced and stored for the video presentation. The system can produce the transition file by analyzing a subtitle file provided, as an example, by the servers that provide the video presentation. In some examples, a system can provide a subtitle in a user's preferred language for display at that point, even if subtitles in a different language are being displayed by default. In this manner, a viewer can activate a rewind control for a video playback device or application, and not only repeat a brief portion of a scene, but also obtain a translation of the dialog at that point into the user's preferred or native language. A subtitle-based rewind feature can be helpful where a movie or television show is subtitled in one language but a viewer has a different native language. Such a feature can also be useful if one is seeking to learn a new language by activating default subtitles in the new language, but needs assistance in a native language from time to time.

Some examples of the present disclosure include a system that receives audio and video data for a video presentation, such as a movie or television show, along with corresponding subtitle text. The system configures time intervals for a rewind input to correspond to display intervals for individual subtitles in the subtitle text. The system can then display the video presentation for a current subtitle timestamp while monitoring the rewind input of a playback device, and can display the video for a previous subtitle timestamp based on the rewind input. The system may optionally be configured to render a corresponding subtitle from the subtitle text in a language specified as a translation preference. The language can be set by a user and can be stored as a translation preference indicator.

If the system is displaying subtitles in some other default language, the subtitle language can be changed for at least one subtitle segment, and may switch back to a default language or no subtitles for subtitle intervals going forward, until and unless the subtitle-based rewind feature is activated again. The subtitle-based rewind feature can be implemented in a client playback application on a playback device for streaming video, in a video streaming provider's back-end services deployed in a cloud network, by a combination of the two, or by any other suitable system. The feature can also be implemented on an internal video network or in a media player.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is an example of a system 100 that provides subtitle-based rewind capability according to some aspects of the disclosure. More specifically, the system 100 includes a cloud network 102. An example of cloud network 102 is a cloud computing system based on a container orchestration platform such as Kubernetes® or OpenShift®, which includes network server clusters that implement pods. These server clusters include one or more memory devices 104. In this example, the server clusters run back-end tasks associated with operating a video streaming service. Aspects and features of the video streaming service include subtitle-based rewind capability. Some back-end tasks are performed by playback task service 106. The playback task service determines the validity of request for particular streaming video and communicates with steering routines to obtain an appropriate list of content delivery network servers 107 available to deliver a requested video stream. The streaming video is typically a specific movie or television show to be streamed to and displayed on a playback device client application 108. Playback device application 108 includes a streaming software application installed in a smart TV, a mobile device, or a set top streaming box. Playback device application 108 may also be a Web browser running scripts or plugins that can be used to watch streaming videos on a desktop or notebook computer.

Content delivery network servers 107 are deployed in a content delivery network (CDN). The CDN makes use of high-performance computing systems, typically deployed at Internet exchange locations around the world. These systems are interconnected by high-speed links. Once playback device application 108 has been authorized and a connection has been established by the back-end services, a streaming video is delivered directly from the CDN to playback device application 108.

The servers within one or more network clusters of cloud network 102 can execute software as defined below, which causes a processing device 110 to perform tasks associates with subtitle-based rewind according to some aspects of the disclosure. Software can include computer-readable instructions that are executable by the processing device 110, such as program code instructions 112. Program code instructions 112 in this example take the form of an operator. An operator is a custom software loop that runs continuously in one or more pods of the cloud computing network and interfaces with an API server 113 for a cluster in order to automate tasks. Program code instructions 112 can be programmed in any suitable programming language, such as Java, C++, C, Python, or any combination of these. The instructions 112 makes use of a transition file 114, a stored list of subtitle transitions that are determined by parsing subtitle text. The instructions 112 also make use of stored language preference(s) 116, which are typically obtained in advance from playback device application 108, though such a preference can be changed after playback of a portion of a video presentation. Subtitle text for the entire synopsis of a streaming video is stored in the CDN servers in a subrip text (SRT) file. The transition file 114 can be stored as a list of subtitle timestamps from the original SRT file, which correspond to timestamps in the streaming video.

Once a user begins to play the media data (such as video and an audio track based on another selected language preference), CDN servers 107 can assemble a file that includes the video, a preferred audio track, and any subtitle text requested by the playback device application 108. The assembled file can be streamed to playback device application 108 as successive portions of a size that is appropriate to be handled by the playback device application 108, given current network conditions and the capabilities of the display device. At the same or substantially the same time, the subtitle text contained in each portion can be parsed to determine where each subtitle would begin to be displayed. Parsing the subtitle text can be accomplished by processing device 110 or by the processing device that is running the playback device application 108. If parsing the subtitle text occurs in the cloud, the portion of the subtitle file that corresponds to the current segment of video being shown can be transmitted to the provider back-end in the cloud network 102 to be parsed. In either case, a list of transitions in transition file 114 can be determined and stored in memory device 104. The transitions can include timestamps from the media presentation where each phrase of the text synopsis contained in the subtitle file stored in the CDN servers begins to be displayed when subtitles are in use.

When a user clicks or selects a control to invoke subtitle-based rewind, the streaming video can begin playing from the previous subtitle transition's timestamp based on the timestamps indicated in the stored transitions of transition file 114. The transitions can be used to partition the video presentation into segments based on individual subtitles. At each timestamp, the subtitle corresponding to the previous segment can be displayed in the preferred language. If subtitles are currently being displayed in another language, such as the default language for a household or for the particular movie release, the subtitle language can switch to the preferred language of the user, as stored in language preference(s) 116 for the segment to which the user has skipped back, providing an on-screen language translation for that segment of the streaming video presentation. The playback can continue at that point. In some examples, if there are intervening subtitle transitions, the subtitles in the preferred language can turn off or switch back to the original language at the next transition. In other examples, this switch can occur when the streaming video display reaches the transition to the segment where the subtitle-based rewind control is first activated, switching back to the original language subtitles, if any.

In the system, program instructions 112 can be deployed in cloud network 102 to perform all or a portion of the tasks to implement subtitle-based rewind. Subtitle-based rewind can be implemented external to the cloud network 102. For example, subtitle-based rewind can be implemented entirely or partially in the playback device client application, such as via a set top box or a so-called smart TV, in advance of, or without, a streaming video provider deploying the feature in its service back end.

Figure 2:
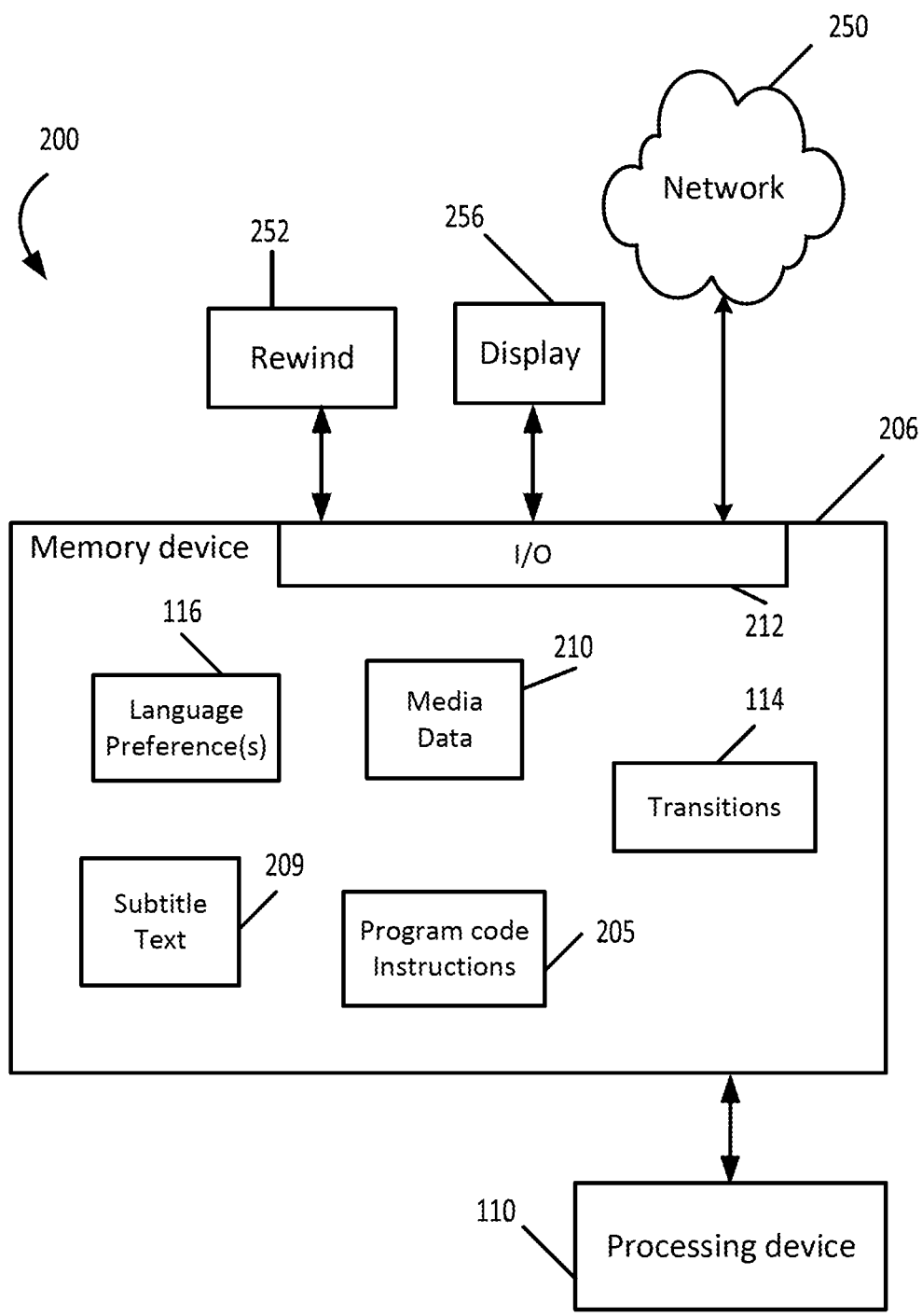
FIG. 2 is a block diagram of another example of a system that provides subtitle-based rewind capability according to some aspects of the disclosure.

FIG. 2 is a block diagram of an example of a system 200 that can provide subtitle-based rewind capability according to some aspects of the disclosure. The system 200 serves as a playback device for streaming media presentations. System 200 includes the processing device 110 communicatively coupled to a memory device 206. The processing device 110 can execute computer program code, also referred to as software, instructions, or program code instructions 205, for providing a video streaming client application, which includes subtitle-based rewind capability. The processing device 110 can include one processing device or multiple processing devices. Non-limiting examples of the processing device 110 include a field-programmable gate array (FPGA), an application-specific integrated circuit (ASIC), a microprocessor, etc. Software can include computer-readable instructions that are executable by a processing device 110, such as program code instructions 205. The system can be programmed in any suitable programming language, such as Java, C++, C, and Python.

In some examples, the processing device 110 of FIG. 2 can receive and store subtitle text 209 and media data 210. Media data 210 can include compressed audio and video frames. Subtitle text 209 can include portions of both original and preferred language text from the relevant SRT files. Media data 210 includes audio and video from one or more portions of the streaming video presentation that are buffered by system 200. Processing device 110 can also parse text and store transitions in a transition file 114. Processing device 110 can also store language preference(s) 116, which can be set by the user of system 200 in advance of streaming videos. In some examples, it is possible to change these preferences in mid-stream; however, a few segments of the streaming video presentation may pass before the change takes effect as new media data 210 and subtitle text 209 may need to be buffered.

System 200 also include an input/output (I/O) module or modules 212, a random-access memory (RAM, not shown), and a bus or interconnect (not shown) to allow for inter- and intra-device communications. I/O module 212 can include a network interface (not shown), which in turn communicates with the networks 250, which in this example include the CDN and a cloud network where provider back-end services are deployed. I/O module 210 can also monitor a rewind input 252, for example, a button on a controller or an icon displayed by the streaming application. Processing device 110 can carry out the subtitle-based rewind if the rewind input indicates that a user has activated the feature. Media data that makes up the streaming video presentation can be presented on display 256.

The memory device 206 can include one memory device or multiple memory devices. The memory device 206 can be non-volatile and may include any type of memory device that retains stored information when powered off. In some examples, at least some of the memory device can include a non-transitory computer-readable medium from which the processing device 110 can read instructions 205. A computer-readable medium can include electronic, optical, magnetic, or other storage devices capable of providing the processing device with computer-readable instructions 205 or other program code. Non-limiting examples of the memory device 206 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions.

Figure 3:
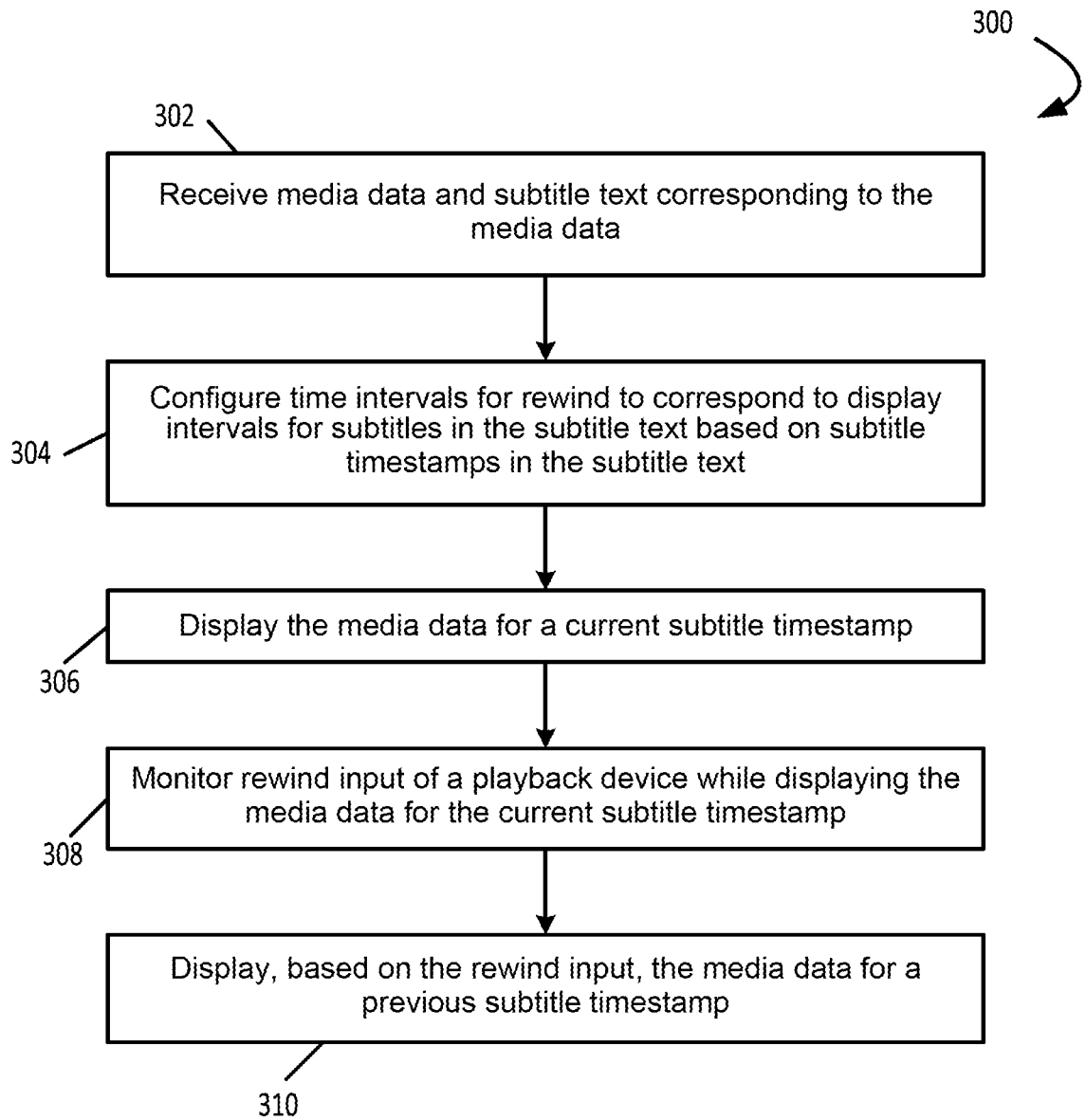
FIG. 3 is a flowchart of an example of a process for providing subtitle-based rewind capability according to some aspects of the disclosure.

In some examples, a processing device can perform one or more of the operations shown in FIG. 3 to provide subtitle-based rewind according to some aspects of the disclosure. In other examples, the computing device can implement more operations, fewer operations, different operations, or a different order of the operations depicted in FIG. 3. Process 300 of FIG. 3 is described below with reference to software components discussed above.

In block 302 of FIG. 3, processing device 110 receives media data and subtitle text corresponding to the media data. The media data, as an example, includes both video information and an audio track for a streaming video. At block 304, processing device 110 configures time intervals for rewind to correspond to display intervals for subtitles in the subtitle text based on subtitle timestamps in the subtitle text. This determination is made by parsing the subtitle text file to determine the timestamps that correspond to the media data. The subtitle transitions can be stored in memory device 104 or memory device 206.

An example of subtitle transitions can be understood from a small sample of subtitle text, which is stored with timestamps corresponding to a streaming video. The timestamps are from the SRT file, portions of which are encapsulated in an HTML stream of the video presentation.

Subtitle 1:
00:02:17,440-->00:02:20,375
Senator, we're making our final approach into Coruscant.
Subtitle 2:
00:02:20,476-->00:02:22,501
Very good, Lieutenant.

In the above example, the subtitle transitions are stored for timestamps 00:02:17,440 and 00:02:20,476 with subtitle segments beginning with each. There is some space between the time when the display of one subtitle ends and the time when the display of the next subtitle begins, which can be ignored or treated as part of the following segment.

At block 306 in FIG. 3, processing device 110 displays the media data for the segment corresponding to a current subtitle timestamp. The media data can be displayed by playing a streaming video on a display device such as display 256. At block 308, processing device 110 monitors a rewind input for the playback device while displaying the media data for the current subtitle timestamp. Processing device 110 monitors the rewind input to determine if a user selects the subtitle-based rewind feature. At block 310, processing device 110 displays the media data for the segment corresponding a previous subtitle timestamp. The subtitle timestamp can correspond to a subtitle transition immediately prior to the current subtitle, or a subtitle transition a number of segments back in the video presentation. The user might, for example, move further back in the presentation by activating the subtitle-based rewind input multiple times in succession. The time intervals for the rewind input to be applied to the media data vary in accordance with the preprogrammed, varying display intervals for subtitles. Optionally, the subtitle that corresponds to a transition selected using the rewind input can be displayed in a selected language as determined by language preference(s) 116.

Figure 4:
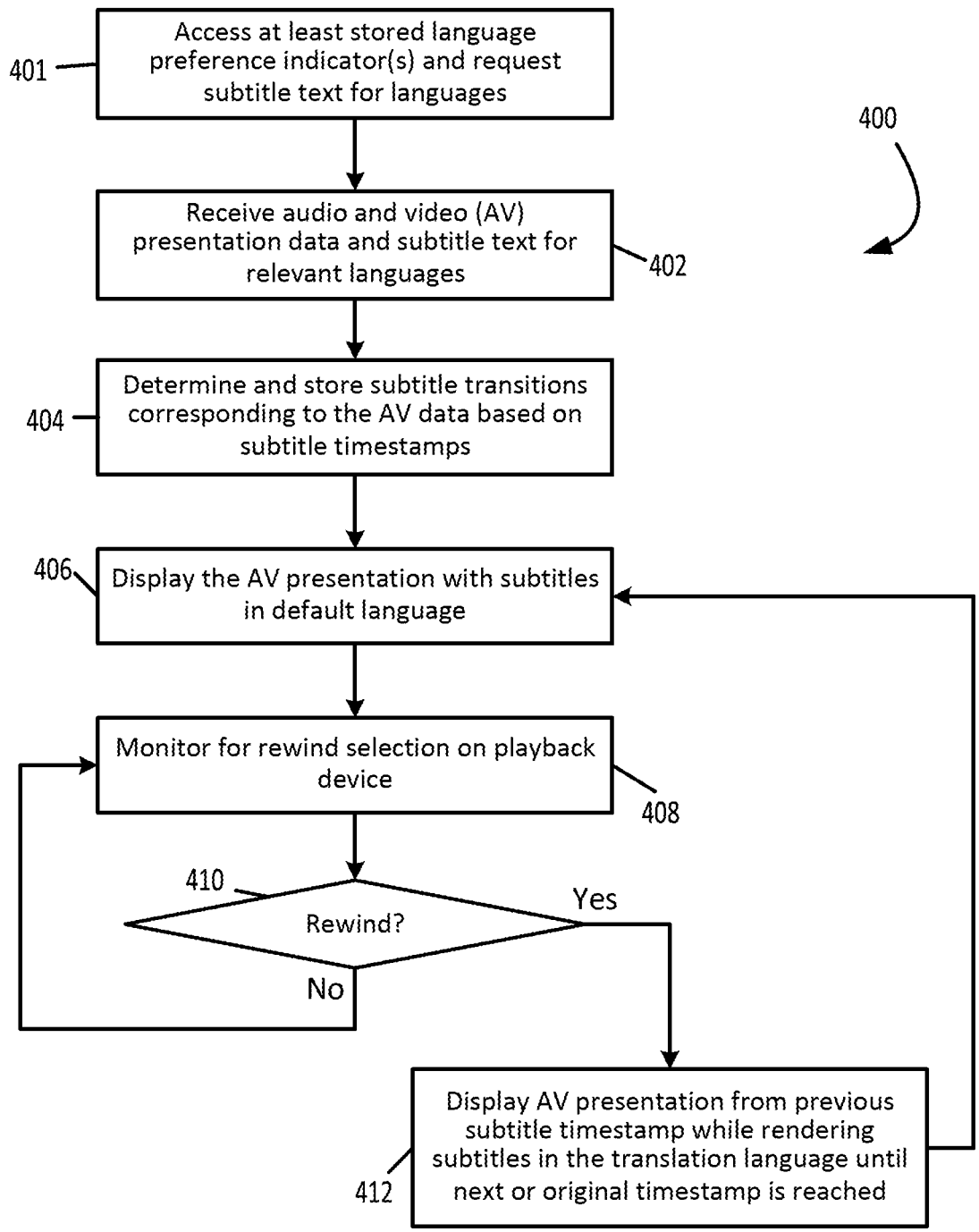
FIG. 4 is a flowchart of another example of a process for providing subtitle-based rewind capability according to some aspects of the disclosure.

FIG. 4 is a flowchart of another example of a process for providing subtitle-based rewind capability according to some aspects of the disclosure. In process 400, subtitles in 2 different languages are used. Such a process may be helpful where a movie or television show is subtitled in one language but a viewer has a different native language. In such a case, the viewer may want to rewind the presentation when a segment is difficult to understand, or contains unfamiliar words in the default language. The presentation in this case would shift to the preferred language subtitle text and repeat the segment. Such a system can also be useful if one is seeking to learn a new language by activating default subtitles in the new language.

At block 401, processing device 110 accesses language preference(s) 116. These language preferences may include either or both of a default language preference and a preferred language preference. In the case of the translation discussed above, the user's native language might correspond to the preferred language preference and a stored indicator of this preference can be referred to as a translation preference indicator. The default language for the video would correspond to a stored default-language preference indicator, either set by a preference, or selected based on the region in which the presentation is playing. Processing device 110 requests subtitle text in both languages. At block 402, processing device 110 receives audio and video presentation data and subtitle text for the relevant languages. At block 404, processing device 110 determines and stores subtitle transitions corresponding to the audio and video (A/V) data based on subtitle timestamps. At block 406, processing device 110 displays the A/V presentation with subtitles in the default language.

At block 408 of FIG. 4, processing device 110 monitors for user input selecting subtitle-based rewind. If no selection is detected at block 410, playing the video and monitoring the rewind input continues. However, if a rewind input is detected at block 410, processing device 110 displays the presentation at block 412 from a previous subtitle timestamp while rendering subtitles in the preferred, alternate, or native translation language determined by the stored translation preference, effectively translating a small portion of the audio of the streaming video for the user. When either the next subtitle transition, or the original rewind point is reached, processing returns to block 406 and display of the audio and video data continues with subtitles in default-language subtitle text.

Any of the processes described above can be implemented in user environments other than those shown in FIG. 1 and FIG. 2. For example, process 300 or process 400 can be implemented on an internal local area network between Wi-Fi connected devices with video streaming applications and an internal video server. The processes can also be implemented using an optical disc player as the playback device. In such a case, a video presentation is streamed from the optical disc and the display is attached, as an example, through an HDMI cable. The various subtitle text files are obtained by accessing the files on the optical disc rather than receiving the files from CDN servers.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device; and
a memory device including instructions that are executable by the processing device for causing the processing device to perform operations comprising:
receiving media data and subtitle text corresponding to the media data;
configuring varying time intervals for a rewind input to be applied to the media data to correspond to display intervals that vary for subtitles in the subtitle text based on subtitle timestamps in the subtitle text;
displaying the media data for a current subtitle timestamp on a playback device; and
displaying, based on the rewind input, the media data for a previous subtitle timestamp on the playback device.

2. The system of claim 1 wherein the operations further comprise:
accessing a translation preference indicator; and
displaying a subtitle from the subtitle text in a translation language corresponding to the translation preference indicator while displaying the media data for the previous subtitle timestamp.

3. The system of claim 2, wherein the operations further comprise:
accessing a stored default subtitle language indicator; and
displaying a subtitle from the subtitle text in a default language corresponding to the stored default subtitle language indicator while displaying the media data for the current subtitle timestamp.

4. The system of claim 1, wherein the varying time intervals for the rewind input to be applied to the media data are configured by a software loop running in at least one pod of a cloud-computing network.

5. The system of claim 4, wherein the at least one pod receives the subtitle text in a subrip text file from a content delivery network server that includes at least a portion of the media data.

6. The system of claim 5, wherein the at least one pod is communicatively coupled to an API server for a cluster including the at least one pod, and wherein the software loop uses the API server to configure the varying time intervals for the rewind input.

7. A method comprising:
receiving, by a processing device, media data and subtitle text corresponding to the media data;
configuring, by the processing device, varying time intervals for a rewind input to be applied to the media data to correspond to display intervals that vary for subtitles in the subtitle text based on subtitle timestamps in the subtitle text;
displaying, by the processing device, the media data for a current subtitle timestamp;
monitoring, by the processing device, the rewind input of a playback device while displaying the media data for the current subtitle timestamp; and
displaying, by the processing device based on the rewind input, the media data for a previous subtitle timestamp.

8. The method of claim 7 further comprising:
accessing a translation preference indicator; and
displaying a subtitle from the subtitle text in a translation language corresponding to the translation preference indicator while displaying the media data for the previous subtitle timestamp.

9. The method of claim 8, further comprising:
accessing a stored default subtitle language indicator; and
displaying a subtitle from the subtitle text in a default language corresponding to the stored default subtitle language indicator while displaying the media data for the current subtitle timestamp.

10. The method of claim 8, wherein the varying time intervals for the rewind input to be applied to the media data are configured by a software loop running in at least one pod of a cloud-computing network.

11. The method of claim 10, wherein the at least one pod receives the subtitle text in a subrip text file from a content delivery network server that includes at least a portion of the media data.

12. The method of claim 10, wherein the at least one pod is communicatively coupled to an API server for a cluster including the at least one pod, and wherein the software loop uses the API server to configure the varying time intervals for the rewind input.

13. A non-transitory computer-readable medium comprising program code that is executable by a processing device for causing the processing device to:
  receive media data and subtitle text corresponding to the media data;
  configure varying time intervals for a rewind input to be applied to the media data to correspond to display intervals that vary for subtitles in the subtitle text based on subtitle timestamps in the subtitle text;
  display the media data for a current subtitle timestamp;
  monitor the rewind input of a playback device while displaying the media data for the current subtitle timestamp; and
  display, based on the rewind input, the media data for a previous subtitle timestamp.

14. The non-transitory computer-readable medium of claim 13, wherein the program code is executable for causing the processing device to:
  access a translation preference indicator; and
  display a subtitle from the subtitle text in a translation language corresponding to the translation preference indicator while displaying the media data for the previous subtitle timestamp.

15. The non-transitory computer-readable medium of claim 14, wherein the program code is executable for causing the processing device to:
  accessing a stored default subtitle language indicator; and
  displaying a subtitle from the subtitle text in a default language corresponding to the stored default subtitle language indicator while displaying the media data for the current subtitle timestamp.

16. The non-transitory computer-readable medium of claim 14, wherein the varying time intervals for the rewind input to be applied to the media data are configured by a software loop running in at least one pod of a cloud-computing network.

17. The non-transitory computer-readable medium of claim 16, wherein the at least one pod receives the subtitle text in a subrip text file from a content delivery network server that includes at least a portion of the media data.

18. The non-transitory computer-readable medium of claim 16, wherein the at least one pod is communicatively coupled to an API server for a cluster including the at least one pod, and wherein the software loop uses the API server to configure the varying time intervals for the rewind input.

* * * * *